United States Patent [19]
Kanamori

[11] Patent Number: 5,829,308
[45] Date of Patent: Nov. 3, 1998

[54] SHIFT LEVER DEVICE

[75] Inventor: Teiji Kanamori, Aichi-ken, Japan

[73] Assignee: Kabushiki Kaisha Tokai-Rika-Denki-Seisakusho, Aichi-ken, Japan

[21] Appl. No.: 769,030

[22] Filed: Dec. 18, 1996

[30] Foreign Application Priority Data

Dec. 28, 1995 [JP] Japan .................................. 7-342508

[51] Int. Cl.$^6$ ............................. F16H 63/38; F16H 59/02
[52] U.S. Cl. ........................................... 74/473.3; 74/538
[58] Field of Search .......................... 74/475, 538, 473.3

[56] References Cited

U.S. PATENT DOCUMENTS

| | | | |
|---|---|---|---|
| 5,445,046 | 8/1995 | Kataumi et al. ...................... | 74/475 X |
| 5,497,673 | 3/1996 | Kataumi et al. ...................... | 74/475 X |
| 5,666,855 | 9/1997 | Ebenstein et al. ........................ | 74/475 |

Primary Examiner—Allan D. Herrmann
Attorney, Agent, or Firm—Sixbey Friedman Leedom & Ferguson; Thomas W. Cole

[57] ABSTRACT

A shift lever device which has a simple structure, and in which there is no need to provide a separate member such as a boot member, and for which assembly and manufacture are easy, and which can be manufactured at a low cost. The shift lever device is formed by a shift lever member, a base member, a shaft fixing portion, and a passage space. A retainer portion for shaft-supporting is provided at a base end portion of the shift lever member. A support portion for mounting the shift lever member such that the shift lever member is rotatable by a predetermined angle is provided at the base member. The shaft fixing portion is provided at a lower portion of the support portion, and shaft-supports the retainer portion within a box-shaped space whose upper portion is open. The passage space is formed in the support portion. With the base end portion of the shift lever member in an inclined state or a horizontal state, the base end portion passes through the passage space to the shaft fixing portion from an opening through which a lever shaft portion passes. The shift lever member, at whose base end portion the retainer portion is provided, is thereby installed to the support portion.

20 Claims, 8 Drawing Sheets

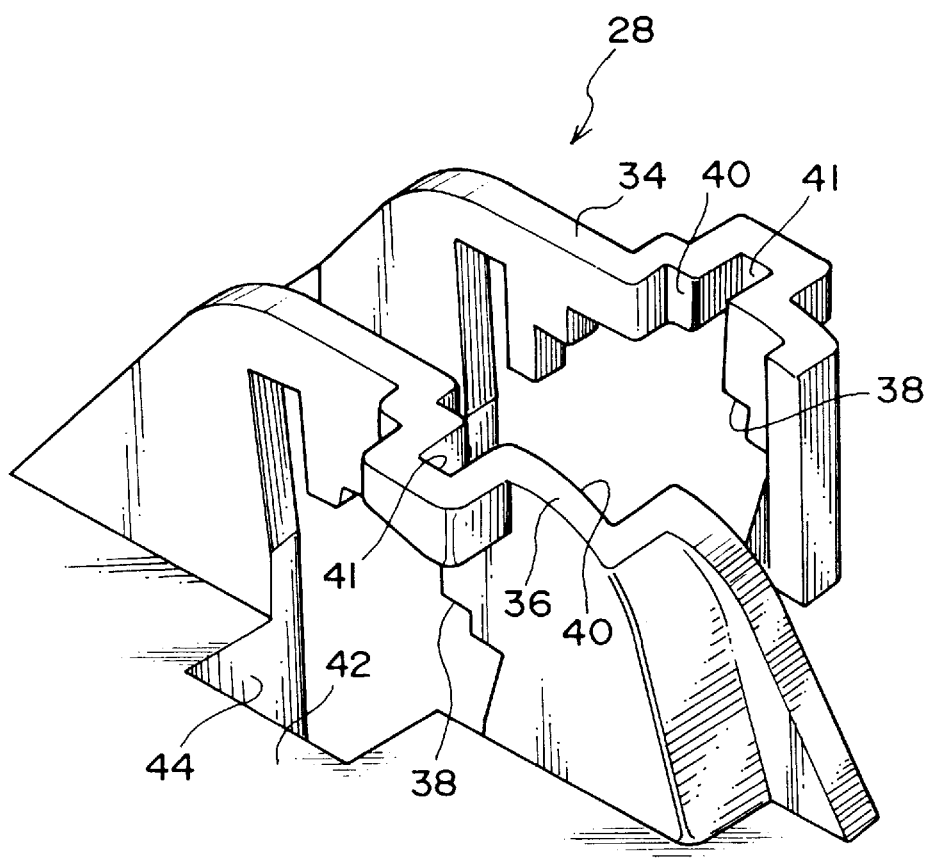
F I G. 3

SHIFT LEVER DEVICE

BACKGROUND OF THE INVENTION

1. Field of the Invention

The present invention relates to a shift lever device which shifts a vehicle transmission and is easy to assemble and manufacture.

2. Description of the Related Art

In general, shift lever devices are used in which, in order to select a desired shift range from a plurality of set shift ranges of an automatic transmission of a vehicle, a shift lever is shifted and a shift position is selected.

Among shift lever members used in such a shift lever device, there are shift lever members which are structured, for example, so as to form on the whole an inverted T shape in which a retainer portion which extends orthogonally with respect to the axis of a rod-shaped lever portion is mounted to the base end portion of the lever portion. The retainer portion is formed in a tube shape and has a shaft hole. With the shaft hole of the retainer portion aligned with a shaft fixing hole formed in the lower portion of a base member which is the housing of the shift lever device, a shaft rod is inserted into and fixed to these holes so that the retainer portion is shaft-supported (pivotally supported). In this way, the shift lever member is shaft-supported to the base member.

A support portion, whose side surfaces are fan-shaped, is formed at the base member so as to correspond to a range of rotation of the shift lever member by a predetermined angle around the shaft-support portion. The support portion has a U-shaped vertical cross-section, and the open groove portion thereof is formed by a thin groove through which the shaft of the lever portion passes.

As a result, when the shift lever device is assembled, because the open groove portion of the support portion is narrow, the retainer portion of the shift lever member cannot be inserted through the open groove portion to the shaft fixing hole of the base member. Therefore, conventionally, an opening through which the retainer portion can pass is provided in a vicinity of the shaft fixing hole at the bottom surface side or the like of the support portion of the base member. First, the retainer portion is inserted through this opening to a portion of the shaft fixing hole of the base member, and is shaft-supported to the base member by a shaft rod. Next, the lever portion is inserted through the open groove portion of the support portion, and the base end side of the lever portion is mounted to the retainer portion. The work involved in mounting the lever portion to the retainer portion is carried out by a worker inserting his/her hand or a tool from the opening provided in a vicinity of the shaft fixing hole of the base member. Therefore, this opening must be made sufficiently large for the mounting work to be able to be carried out.

A bag-shaped boot member is provided at the base member in order to close the opening of the support member and prevent water or the like from entering.

When the shift lever device is being assembled, because the lever portion must be mounted to the retainer portion through the narrow opening of the base member, workability is poor. Further, because the opening is provided in the base member, a reinforced, complicated structure which provides sufficient strength in the vicinity of the shaft fixing hole of the base member must be used. Moreover, the boot member must be provided, and work for mounting the boot member to the base member must be carried out. Therefore, the structure becomes complicated, the number of parts increases, and the number of work processes increases. As a result, the manufacturing cost increases, and the manufactured product becomes more expensive.

SUMMARY OF THE INVENTION

In view of the aforementioned, an object of the present invention is to provide a shift lever device which has a simplified structure, in which there is no need to use another member such as a boot member, in which the assembly manufacturing work is facilitated, and which can be manufactured at a low cost.

In accordance with a first aspect of the present invention, there is provided a shift lever device comprising: a shift lever member at which a retainer portion for shaft-supporting is provided at a base end portion of a lever shaft portion; a base member provided with a support portion for mounting the shift lever member such that the shift lever member is rotatable over a predetermined angle; a shaft fixing portion provided at a lower portion of the support portion and shaft-supporting the retainer portion within a box-shaped space whose upper portion is open; and a passage space formed in the support portion such that the base end portion of the shift lever member, which base end portion has the retainer portion, passes in one of an inclined state and a horizontal state through the passage space to the shaft fixing portion from an opening portion through which the lever shaft portion passes.

In accordance with the above structure, the shift lever member is directly assembled to the support portion by the shift lever member, at which the retainer portion is mounted integrally to the base end portion of the lever shaft portion, being made to pass through the passage space from the base end portion side of the shift lever member, and the retainer portion being inserted into and shaft-supported (pivotally supported) at the shaft fixing portion.

In accordance with a second aspect of the present invention, there is provided a shift lever device comprising: a shift lever member at which a retainer portion for shaft-supporting is provided at a base end portion of a lever shaft portion; a detent pin which projects from the lever shaft portion of the shift lever member and is operable so as to be movable in an axial direction of the lever shaft portion; a base member provided with a support portion for mounting the shift lever member such that the shift lever member is rotatable over a predetermined angle; a shaft fixing portion provided at a lower portion of the support portion and shaft-supporting the retainer portion within a box-shaped space whose upper portion is open; a detent portion provided at an upper portion of the support portion, and having a detent hole for restricting rotation of the detent pin integrally with the shift lever member around the retainer portion; and a passage space formed in the support portion such that the base end portion of the shift lever member, which base end portion has the retainer portion, passes in one of an inclined state and a horizontal state through the passage space to the shaft fixing portion from an opening portion of the detent portion through which opening portion the lever shaft portion passes.

In accordance with the above structure, even in a case in which the detent portion is provided at the support portion, the shift lever member, at which the retainer portion is mounted integrally to the base end portion of the lever shaft portion, is passed through the passage space, which is provided from the detent portion, from the retainer portion side of the shift lever member. The shift lever member is inserted into the shaft fixing portion, and the retainer portion is shaft-supported. In this way, the shift lever member is directly assembled to the support portion.

The above and other objects, features and advantages of the present invention will become apparent from the following description and the appended claims taken in conjunction with the accompanying drawings in which a preferred embodiment of the present invention is shown by way of illustrative example.

BRIEF DESCRIPTION OF THE DRAWINGS

The invention will now be described with reference to the accompanying drawings wherein:

FIG. 3 is a perspective view of main portions illustrating a structure of a detent portion at the base member of the shift lever device relating to the embodiment of the present invention;

DESCRIPTION OF THE PREFERRED EMBODIMENT

Figure 1:
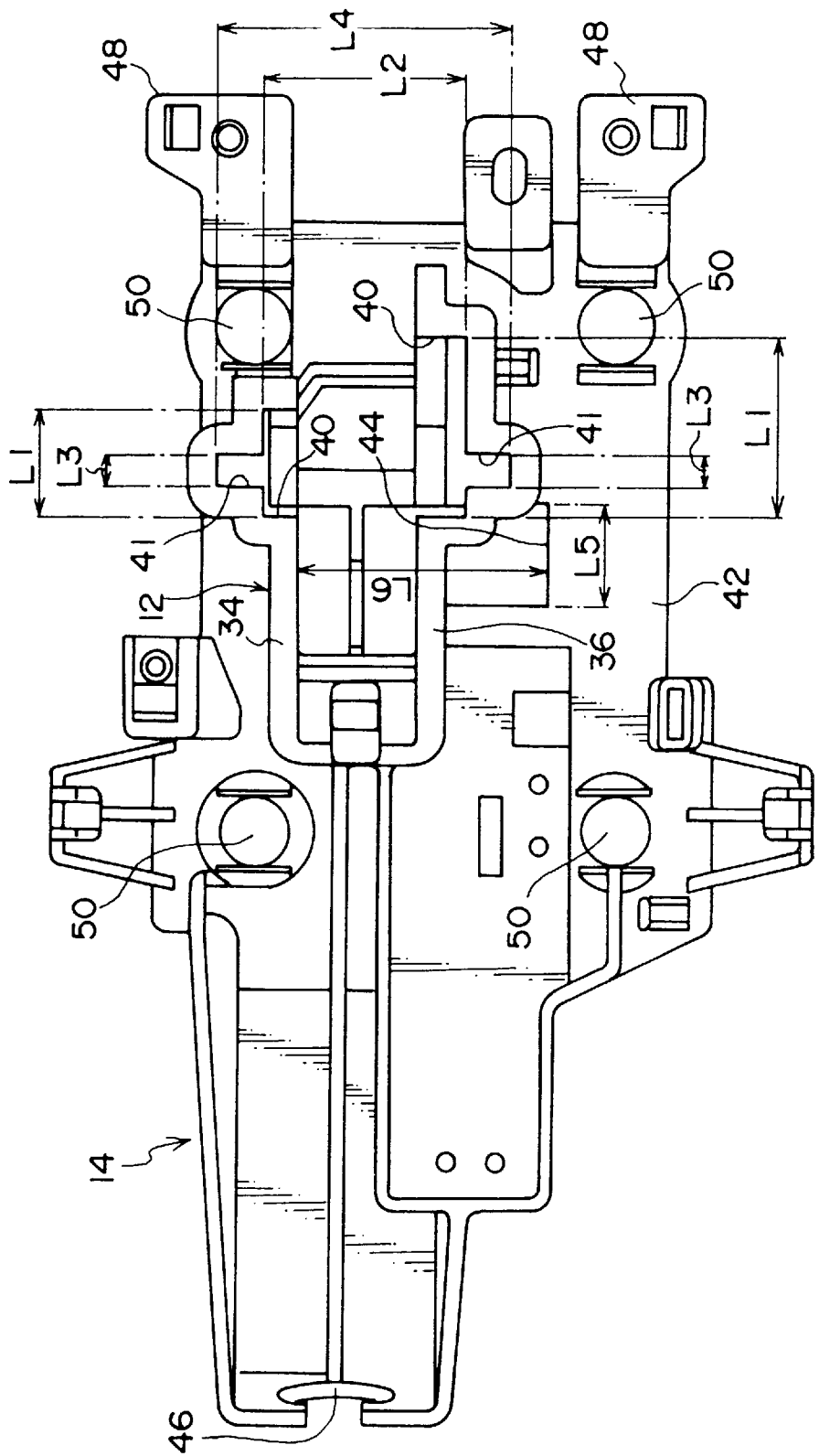
FIG. 1 is a plan view illustrating a base member of a shift lever device relating to an embodiment of the present invention.
Figure 2:
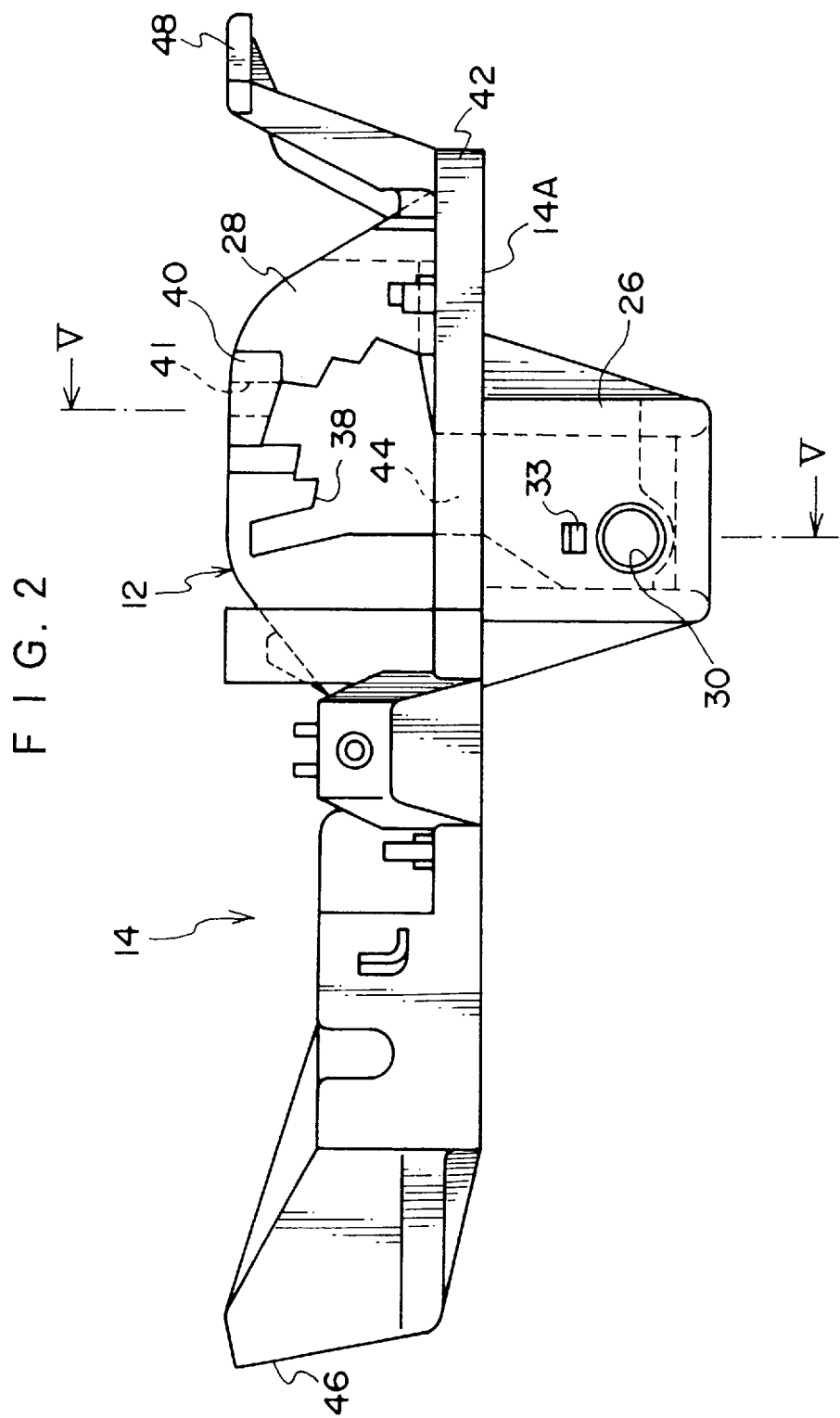
FIG. 2 is a side view illustrating the base member of the shift lever device relating to the embodiment of the present invention.
Figure 4:
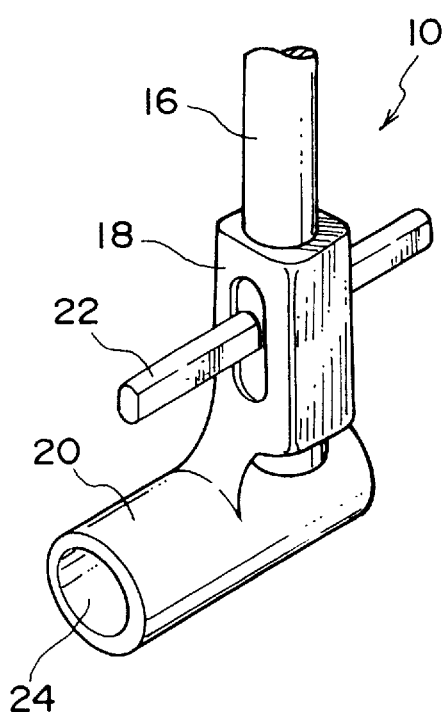
FIG. 4 is a perspective view of main portions illustrating a base end portion at a shift lever member of the shift lever device relating to the embodiment of the present invention, a retainer portion being provided at the base end portion.

A shift lever device relating to the embodiment of the present invention is structured by a shift lever member 10, whose base end side portion is illustrated in FIG. 4, and a base member 14 formed integrally with a support portion 12 as illustrated in FIGS. 1 and 2 which is structured such that the shift lever member 10 can easily be assembled to the base member 14.

The shift lever member 10 includes a detent pin portion 18 and a retainer portion 20 at the lower end portion of a lever shaft portion 16.

A thin, rod-shaped detent pin 22, which passes through the detent pin portion 18 in a direction orthogonal to the lever shaft portion 16, is provided so as to be movable in the axial direction of the lever shaft portion 16. The detent pin 22 is moved and operated interlockingly with the operation of an unillustrated operation button provided at the free end portion of the lever shaft portion 16.

The retainer portion 20 is provided integrally with a portion which extends from the detent pin portion 18 downwardly at an angle with respect to the bottom end of the lever shaft portion 16 in FIG. 4. The retainer portion 20 is formed in a tube-like shape of a predetermined length having a shaft receiving hole 24 so that the retainer portion 20 has high rigidity in the direction orthogonal to the direction in which the shift lever member 10 rotates.

The shaft receiving hole 24 of the retainer portion 20 is provided so as to be directed in a direction orthogonal to the axis of the lever shaft portion 16. More specifically, a vicinity of one end portion of the retainer portion 20 is fixed integrally to the lower end portion of the lever shaft portion 16 such that the shift lever member 10 is formed in a substantially L-shaped configuration.

Figure 8:
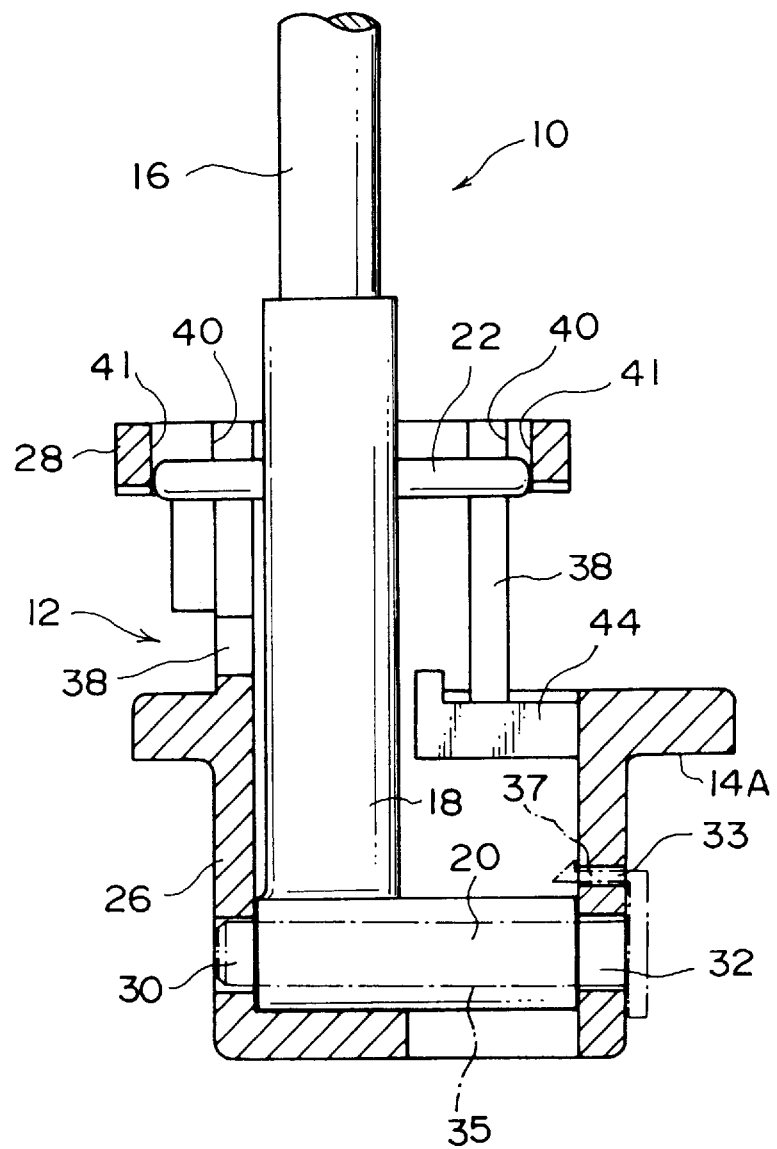
FIG. 8 is a sectional explanatory view corresponding to the cross-section along the line 5—5 in FIG. 2 and illustrating a final fourth step in the assembling of the shift lever device relating to the embodiment of the present invention.

The base end portion of the shift lever member 10 which is formed in a substantially L-shaped configuration is installed at the support portion 12 such that the shaft lever member 10 can rotate a predetermined angle. A shaft fixing portion 26 and a detent portion 28 are formed at the support portion 12. As illustrated in FIG. 2, the shaft fixing portion 26 is provided beneath (in the figure) a reference surface portion 14A which corresponds to a plate surface portion of the base member 14 which is formed as a base plate. The detent portion 28 is provided above (in the figure) the reference surface portion 14A. An elongated hole through which the lever shaft portion 16 passes is formed in the portion of the base member 14 at which the support portion 12 is provided. As illustrated in FIG. 2 and FIG. 8, the shaft fixing portion 26 of the support portion 12 is formed as a portion having a rectangular, box-shaped space whose upper surface portion is open. As illustrated in FIG. 8, the distance between the surfaces of the opposing side walls within the box which forms the shaft fixing portion 26 is set to be slightly longer than the length of the retainer portion 20. Shaft fixing holes 30, 32 and a detent insertion hole 33, which are all through-holes, are formed in the lower left portions (in FIG. 2) of the opposing side walls of the box which forms the shaft fixing portion 26.

As illustrated in FIGS. 1, 2 and 3, two side plate portions 34, 36, which are aligned along the longitudinal direction of a long, thin groove through which the lever shaft portion 16 passes, are provided upright at the detent portion 28 of the support portion 12.

Detent holes 38 of the same configuration are formed in the side plate portions 34, 36. Portions in vicinities of both ends of the detent pin 22 face the detent holes 38. Due to the operation of the operation button, the detent pin 22 is moved. In a state in which the detent pin 22 is separated from the convex and concave portions of the detent holes 38, the shift lever is rotated, and shifting operation is carried out.

First relief concave portions 40, which are wide, and second relief concave portions 41, which are narrow, are formed at the upper portion intermediate portions in FIGS. 2 and 3 of the side plate portions 34, 36. The first relief concave portions 40 and the second relief concave portions 41 project outwardly to the sides so as to form a passage space, portions of the side plates of the passage space being formed so as to project in substantially U-shaped configurations over two steps.

Figure 5:
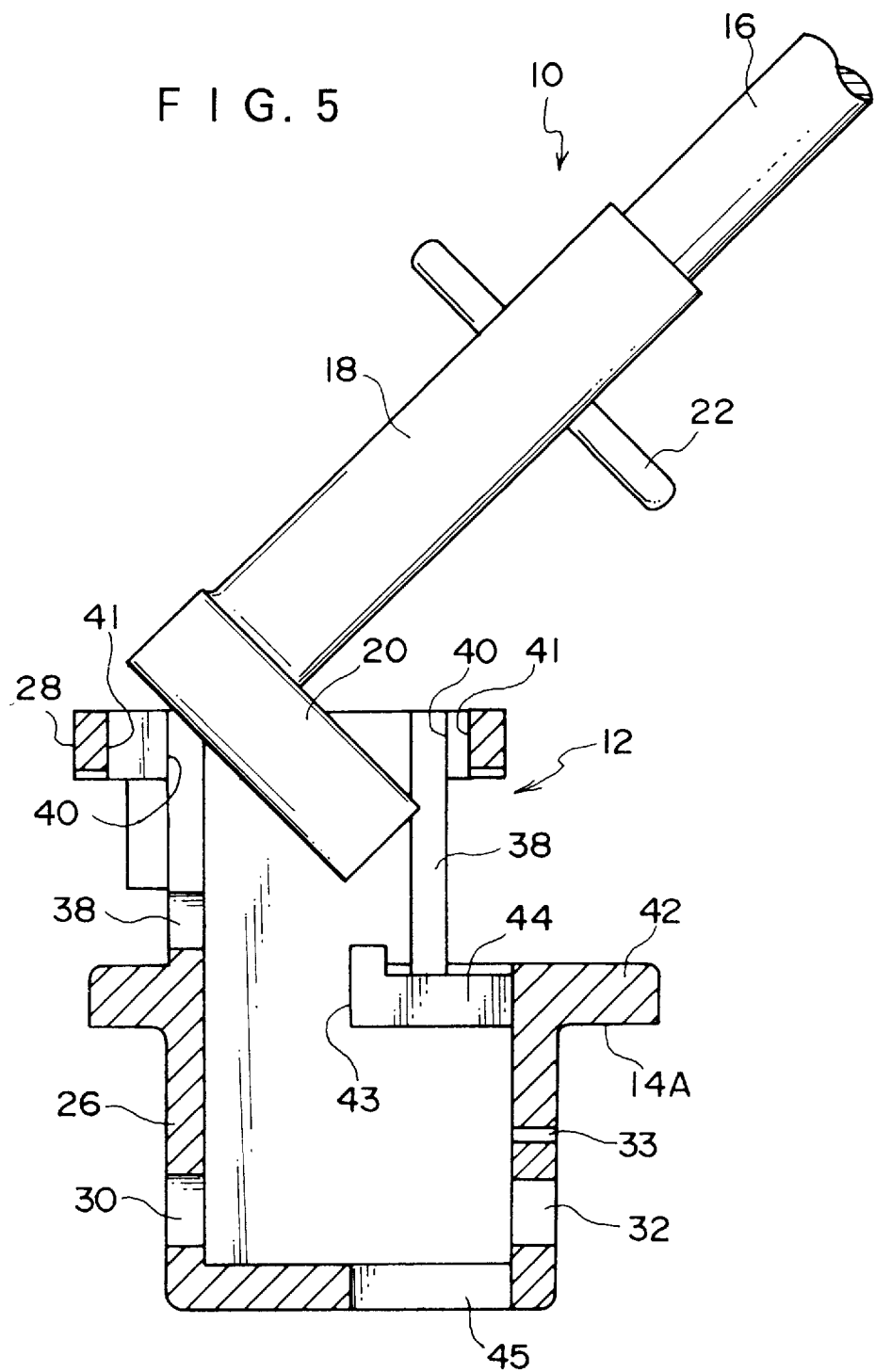
FIG. 5 is a sectional explanatory view corresponding to a cross-section along the line 5—5 in FIG. 2 and illustrating an initial first step in the assembling of the shift lever device relating to the embodiment of the present invention.
Figure 6:
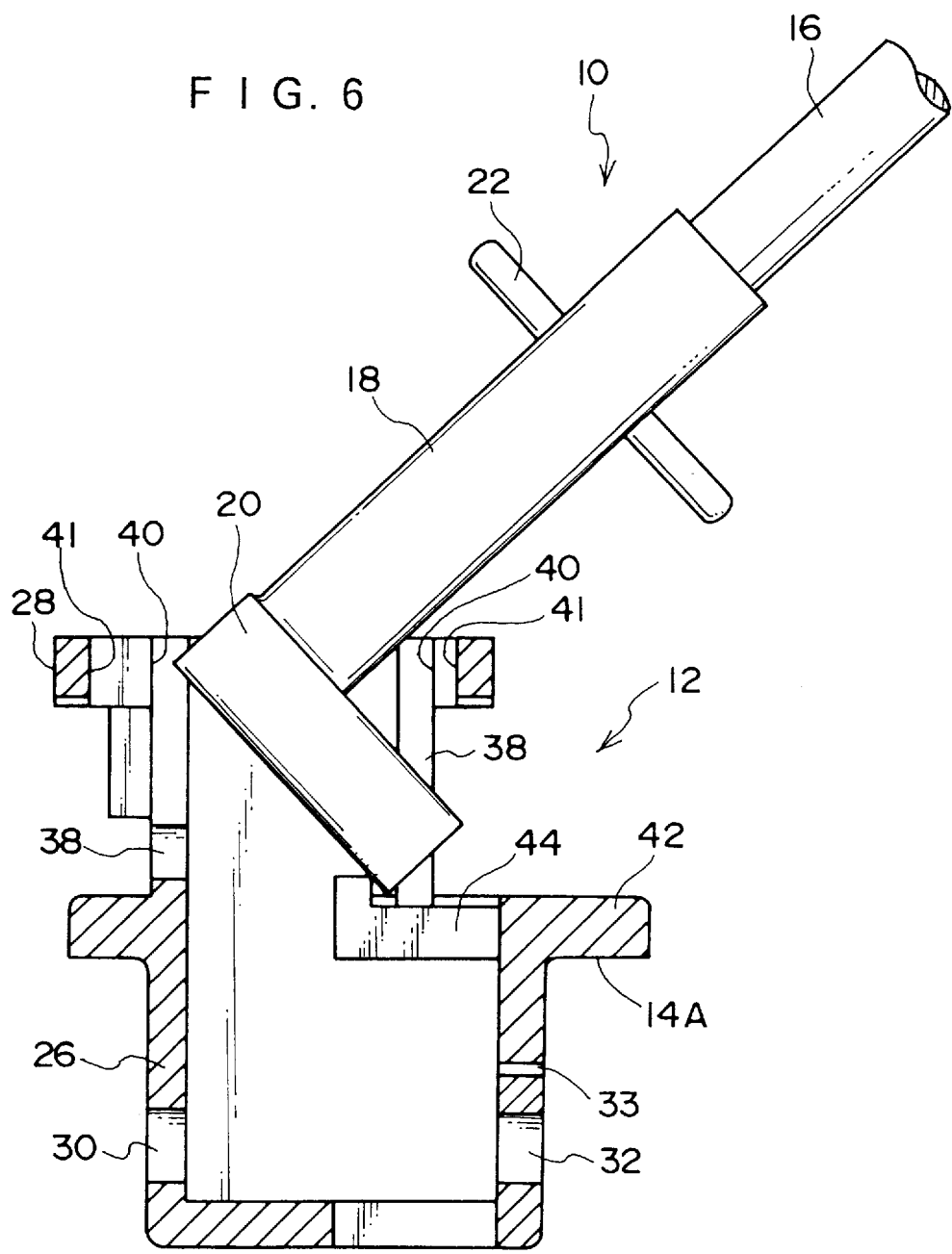
FIG. 6 is a sectional explanatory view corresponding to the cross section along the line 5—5 in FIG. 2 and illustrating a second step in the assembling of the shift lever device relating to the embodiment of the present invention.

The distances L1 between the inside side walls of the first relief concave portions 40 are formed so as to be greater than the outer diameter of the retainer portion 20. Further, the distance L2 between the inner side back surfaces of the respective first relief concave portions 40 which oppose one another is, as illustrated in FIGS. 5 and 6, of a size which allows the retainer portion 20 to pass therethrough when the retainer portion 20 is at least in an inclined state.

The distance L3 between the inside side walls of the second relief concave portions 41 as illustrated in FIG. 1 is formed to be larger than the outer diameter of the detent pin 22.

The distance L4 between the inner side back surfaces of the respective second relief concave portions 41 which oppose one another is formed to be longer than the entire length of the detent pin 22.

The detent pin 22 is able to pass through the space between the second relief concave portions 41 which oppose one another.

The first relief concave portions 40 and the second relief concave portions 41 can be provided in any of a variety of sizes and configurations, provided that the retainer portion 20, which is fixed in a substantially L-shape to the lever shaft portion 16, can pass through the opening portion formed between the first relief concave portions 40 and the second relief concave portions 41 with the extended free end portion of the retainer portion 20 being inserted first and the retainer portion 20 being at least in an inclined state (a horizontal state is also possible), and provided that the detent pin 22 can horizontally pass through the opening portion formed between the first relief concave portions 40 and the second relief concave portions 41.

The relief concave portions 40 are positioned at the upper sides (in the figures) of the detent holes 38. The vertical direction (in the figures) height of the relief concave portions 40 is made small, and the relief concave portions 40 are formed so as to not enter into the inner portions of the detent holes 38.

Figure 7:
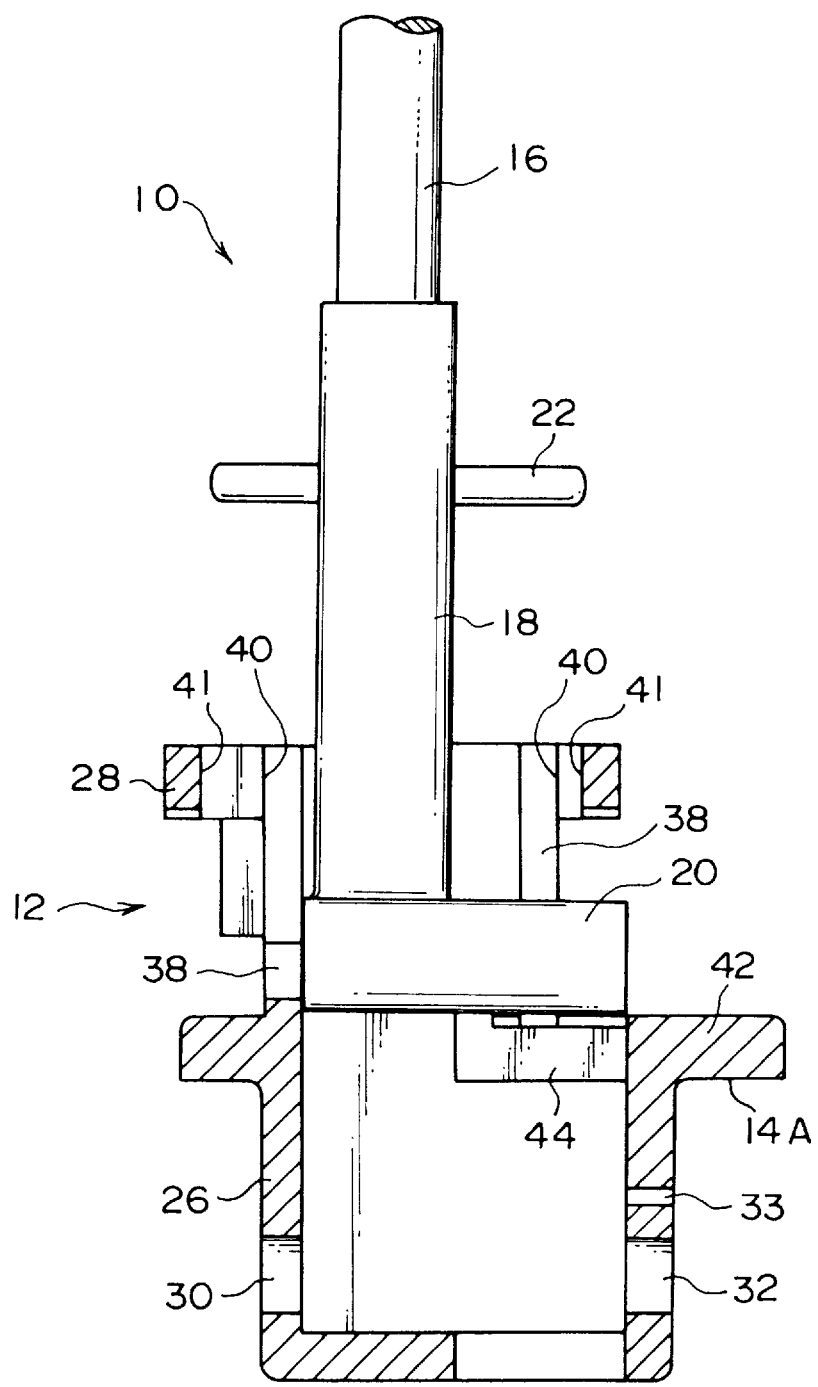
FIG. 7 is a sectional explanatory view corresponding to the cross-section along the line 5—5 in FIG. 2 and illustrating a third step in the assembling of the shift lever device relating to the embodiment of the present invention.

A through-hole 44 which forms a passage space is formed in a flat plate portion 42 at the reference surface 14A region of the support portion 12. The through hole 44 is formed as an opening which communicates from the detent hole 38 to the box-shaped space of the shaft fixing portion 26. As illustrated in FIG. 1, the through hole 44 is formed at least to have a horizontal width L5, which is larger than the outer diameter of the retainer portion 20, and a vertical width L6, which corresponds to the axial direction length of the retainer portion 20, such that as illustrated in FIG. 7, the retainer portion 20 can in a horizontal state pass through the flat plate portion 42 and enter into the shaft fixing portion 26.

An inner side end surface 43 of the support portion 12 at the flat plate portion 42 is formed in a side surface which guides the detent pin portion 18.

As illustrated in FIGS. 1 and 2, portions such as a shift cable fixing engagement hole 46, which is connected to the shift lever member 10, and a supporting stand portion 48, for mounting an upper side case, are formed integrally with the base member 14 which has the support portion 12. Four through-holes 50, for fastening by screws to an unillustrated structural member fixed to the vehicle body, are formed in predetermined regions of the base member 14.

The shaft fixing portion 26 of the support portion 12 is formed in the shape of a box whose upper portion is open. No opening is formed in the lower portion and the bottom surface portion of the shaft fixing portion 26 other than a small hole 45 through which passes a portion of a mold which is used to form the through-hole 44. Therefore, there is no need to provide at this portion a separate cover member such as a boot member for preventing the entry of water or the like.

The processes for assembling the shift lever member 10 to the support portion 12 of the base member 14 in order to manufacture the shift lever device will be described hereinafter.

In the first step, as illustrated in FIG. 5, the shift lever member 10 is inserted, from the retainer portion 20 side thereof, at an angle into the region of the first and second relief concave portions 40, 41 with the extended free end portion of the retainer portion 20, which is fixed in a substantial L-shape to the lever shaft portion 16, being inserted first. In the second step, as illustrated in FIG. 6, while this inclined state is maintained, the bottom end of the retainer portion 20 is lowered directly down until the bottom end reaches the position of the reference surface 14A.

Next, in the third step, while the right side end portion (in the figures) of the retainer portion 20 is inserted into one of the detent holes 38, the shift lever member 10 is rotated counterclockwise in the figures. In this way, as illustrated in FIG. 7, the lever shaft portion 16 of the shift lever member 10 is set upright, and the retainer portion 20 is set at a position at which the retainer portion 20 can enter into the box-shaped space of the shaft fixing portion 26 from the through-hole 44. Next, in the fourth step, from the position illustrated in FIG. 7, the shift lever member 10 is lowered directly down and inserted into the shaft fixing portion 26 such that the shaft hole of the retainer portion 20 and the two shaft fixing holes 30, 32 are aligned so as to coincide with one another as illustrated in FIG. 8. In FIG. 8, in the state in which the retainer portion 20 abuts the bottom surface of the shaft fixing portion 26, these shaft holes are all aligned.

Next, a shaft rod 35 is inserted into and fastened to the two shaft fixing holes 30, 32 and the shaft hole of the retainer portion 20 which are all aligned. A rotation-stopping member 37 which is fixed to the shaft rod 35 is fit with and fixed to a rotation-stopping member insertion hole 33, so that the shift lever member 10 is shaft-supported with respect to the shaft fixing portion 26.

As described above, in the state illustrated in FIG. 8 in which the shift lever member 10 is shaft-supported to the base member 14, the detent pin 22 is in the second relief concave portions 41, and rotation of the shift lever member 10 is prevented. Therefore, by operating the unillustrated operation button of the shift lever member 10, the detent pin 22 is pushed downward in the figures, and in the state in which the detent pin 22 is inserted with play into the space of the detent holes 38, the shift lever member 10 is rotated and can be moved to another shift position. The detent pin 22 corresponds to the convex and concave configurations of the top sides (in the figures) of the detent holes 38, and limits the shifting of the shift lever member 10.

As described above, the shift lever device relating to the present invention has an excellent effect in that it can be manufactured inexpensively because the structure thereof is simple, there is no need to use a separate member such as a boot member or the like, and the work involved in assembly and manufacture thereof is easy.

What is claimed is:

1. A shift lever device comprising:
   a shift lever member at which a retainer portion having a width for supporting said lever member is provided at a base end portion of a lever shaft portion;
   a base member provided with a support portion for mounting said shift lever member such that said shift lever member is rotatable over a predetermined angle;
   a shaft fixing portion provided at a lower portion of the support portion for supporting the retainer portion within a box-shaped space whose upper portion is open; and
   a passage space formed in the support portion having an upper portion with a first width that is smaller than said width of said retainer portion and a lower portion with a second width larger than said first width and at least as large as said width of said retainer portion such that the base end portion of said shift lever member, which base end portion has the retainer portion, is receivable within said upper portion in an inclined state and is receivable within said lower portion in a horizontal state through said passage space to said shaft fixing portion from an opening portion through which the lever shaft portion passes.

2. A shift lever device according to claim 1, wherein a detent pin, which projects from the lever shaft portion of said shift lever member and is operable so as to be movable in an axial direction of the lever shaft portion, is provided at said shift lever member.

3. A shift lever device according to claim 2, wherein a detent portion is provided at an upper portion of the support portion, the detent portion having a detent hole for restricting rotation of the detent pin integrally with said shift lever member around the retainer portion.

4. A shift lever device according to claim 3, wherein the detent portion is formed by two side plate portions which are provided upright and side by side along a longitudinal direction thereof so as to form a long, thin groove having a width such that the lever shaft portion is able to pass through the long, thin groove.

5. A shift lever device according to claim 4, wherein said passage space includes wide first relief concave portions, through which the retainer portion passes, and narrow second relief concave portions, through which the detent pin passes, said first relief concave portions and said second relief concave portions being formed so as to project toward transverse outer sides of the two side plate portions of the detent portion.

6. A shift lever device according to claim 5, wherein said passage space includes a through-hole which is formed in said base member such that the retainer portion is able to pass through the through-hole to said shaft fixing portion.

7. A shift lever device according to claim 1, wherein said shift lever member is formed in a substantially L-shaped configuration by the retainer portion being oriented in a direction orthogonal to an axis of the lever shaft portion and one end portion of the retainer portion being fixed integrally to the base end portion of the lever shaft portion.

8. A shift lever device according to claim 7, wherein the retainer portion is shaped as a tube having a predetermined length and a shaft receiving hole.

9. A shift lever device according to claim 8, wherein shaft fixing holes are formed in vehicle transverse direction side surfaces of a lower portion of said shaft fixing portion, and the lever shaft portion is shaft-supported to said shaft fixing portion by a shaft rod passing through the shaft fixing holes and the shaft receiving hole of the retainer portion.

10. A shift lever device according to claim 9, wherein a rotation-preventing member insertion hole is formed in a vehicle transverse direction side surface of the lower portion of said shaft fixing portion, a rotation-preventing member is fixed to the shaft rod, and rotation of the shaft rod is prevented by the rotation-preventing member being fit with the rotation-preventing member insertion hole.

11. A shift lever device comprising:

a shift lever member at which a retainer portion for supporting said lever member is provided at a base end portion of a lever shaft portion;

a detent pin which projects from the lever shaft portion of said shift lever member and is operable so as to be movable in an axial direction of the lever shaft portion;

a base member provided with a support portion for mounting said shift lever member such that said shift lever member is rotatable over a predetermined angle;

a shaft fixing portion provided at a lower portion of the support portion for supporting the retainer portion within a box-shaped space whose upper portion is open;

a detent portion provided at an upper portion of the support portion, and having a detent hole for restricting rotation of said detent pin integrally with said shift lever member around the retainer portion; and a passage space formed in the support portion having an upper portion with a first width that is smaller than said width of said retainer portion and a lower portion with a second width larger than said first width and at least as large as said width of said retainer portion such that the base end portion of said shift lever member, which base end portion has the retainer portion, is receivable within said upper portion in an inclined state and is receivable within said lower portion in a horizontal state through said passage space to said shaft fixing portion from an opening portion of said detent portion through which opening portion the lever shaft portion passes.

12. A shift lever device according to claim 11, wherein the detent portion is formed by two side plate portions which are provided upright and side by side along a longitudinal direction thereof so as to form a long, thin groove having a width such that the lever portion is able to pass through said groove.

13. A shift lever device according to claim 12, wherein said passage space includes wide first relief concave portions, through which the retainer portion passes, and narrow second relief concave portions, through which the detent pin passes, said first relief concave portions and said second relief concave portions being formed so as to project toward transverse outer sides of the two side plate portions of the detent portion.

14. A shift lever device according to claim 13, wherein said passage space includes a through-hole which is formed in said base member such that the retainer portion is able to pass through the through-hole to said shaft fixing portion.

15. A shift lever device according to claim 11, wherein said shift lever member is formed in a substantially L-shaped configuration by the retainer portion being oriented in a direction orthogonal to an axis of the lever shaft portion and one end portion of the retainer portion being fixed integrally to the base end portion of the lever shaft portion.

16. A shift lever device according to claim 15, wherein the retainer portion is shaped as a tube having a predetermined length and a shaft receiving hole.

17. A shift lever device according to claim 16, wherein shaft fixing holes are formed in vehicle transverse direction side surfaces of a lower portion of said shaft fixing portion, and the lever shaft portion is shaft-supported to said shaft fixing portion by a shaft rod passing through the shaft fixing holes and the shaft receiving hole of the retainer portion.

18. A shift lever device according to claim 17, wherein a rotation-preventing member insertion hole is formed in a vehicle transverse direction side surface of the lower portion of said shaft fixing portion, a rotation-preventing member is fixed to the shaft rod, and rotation of the shaft rod is prevented by the rotation-preventing member being fit with the rotation-preventing member insertion hole.

19. A shift lever device comprising:

a shift lever member at which a retainer portion for supporting said lever member is provided at a base end portion of a lever shaft portion;

a detent pin which projects from the lever shaft portion of said shift lever member and is operable so as to be movable in an axial direction of the lever shaft portion;

a base member provided with a support portion for mounting said shift lever member such that said shift lever member is rotatable over a predetermined angle;

a shaft fixing portion provided at a lower portion of the support portion for supporting the retainer portion within a box-shaped space whose upper portion is open;

a detent portion provided at an upper portion of the support portion, and having a detent hole for restricting rotation of said detent pin integrally with said shift lever member around the retainer portion; and a passage space formed in the support portion such that the base end portion of said shift lever member, which base end portion has the retainer portion, passes in one of an inclined state and a horizontal state through said passage space to said shaft fixing portion from an opening portion of said detent portion through which opening portion the lever shaft portion passes, said passage space including relief concave portions which are formed in said detent portion and through which the retainer portion and said detent pin pass, and including a through-hole which is formed in said base member and through which the retainer portion can pass to said shaft fixing portion.

20. A shift lever device according to claim 19, wherein said shift lever member is formed in a substantially L-shaped configuration by the retainer portion being oriented in a direction orthogonal to an axis of the lever shaft portion and one end portion of the retainer portion being fixed integrally to the base end portion of the lever shaft portion.

* * * * *